(12) United States Patent
Clarke

(10) Patent No.: US 10,569,930 B2
(45) Date of Patent: Feb. 25, 2020

(54) CONTAINER WITH FRANGIBLE WEAKENED PORTION AND MANUFACTURE THEREOF

(71) Applicant: GR8 Engineering Limited, Chichester, West Sussx (GB)

(72) Inventor: Peter Reginald Clarke, West Sussex (GB)

(73) Assignee: GR8 Engineering Limited, Chichester, West Sussex (GB)

(*) Notice: Subject to any disclaimer, the term of this patent is extended or adjusted under 35 U.S.C. 154(b) by 0 days.

(21) Appl. No.: 15/767,857

(22) PCT Filed: Oct. 5, 2016

(86) PCT No.: PCT/EP2016/073771
§ 371 (c)(1),
(2) Date: Apr. 12, 2018

(87) PCT Pub. No.: WO2017/063928
PCT Pub. Date: Apr. 20, 2017

(65) Prior Publication Data
US 2018/0305074 A1    Oct. 25, 2018

(30) Foreign Application Priority Data
Oct. 16, 2015   (GB) .................................. 1518363.5

(51) Int. Cl.
*B65D 17/28*      (2006.01)
*B65B 61/18*      (2006.01)
(Continued)

(52) U.S. Cl.
CPC ............ *B65D 17/404* (2018.01); *B65B 61/18* (2013.01); *B65D 43/0285* (2013.01); *B29C 59/007* (2013.01); *B29C 2791/009* (2013.01)

(58) Field of Classification Search
CPC .. B65D 17/00–17/404; B65D 43/00–43/0285; B65B 61/00–61/18;
(Continued)

(56) References Cited

U.S. PATENT DOCUMENTS 4,555,056 A * 11/1985 Bernhardt .......... B65D 43/0216
206/807
4,795,055 A *  1/1989 Ingemann .......... B65D 43/0272
220/257.2

(Continued)

OTHER PUBLICATIONS

International Preliminary Report on Patentability for corresponding PCT Application No. PCT/EP/2016/073771 dated Apr. 17, 2018.
(Continued)

*Primary Examiner* — Kareen K Thomas
(74) *Attorney, Agent, or Firm* — Polsinelli, PC

(57) ABSTRACT

A container, in the form of a container body or container closure, or a lid, having a frangible weakened portion formed in a layer of polyethylene terephthalate forming a wall of the container, the weakened portion comprising a groove cut into a first surface of the layer, a first portion of the layer surrounding the groove having a crystallinity of from 35 to 45%, and a second portion of the layer, which second portion is adjacent to the first portion on opposite sides of the groove and remote from the groove, the second portion having a crystallinity at least 5% less than the crystallinity in the first portion, wherein the layer has a thickness of from 200 to 700 μm and the groove has a depth of from 200 to 500 μm.

40 Claims, 2 Drawing Sheets

(51) Int. Cl.
 *B65D 43/02* (2006.01)
 *B29C 59/00* (2006.01)
(58) Field of Classification Search
 CPC .............................. B29C 59/00–59/007; B29C 2791/00–2791/009
 USPC ................ 220/255.1, 258.3–258.5, 265–280
 See application file for complete search history.

(56) References Cited

U.S. PATENT DOCUMENTS

| | | | | |
|---|---|---|---|---|
| 5,301,827 | A * | 4/1994 | Valyi | B65D 17/4012 220/254.3 |
| 6,427,420 | B1 | 8/2002 | Unisabi | |
| 7,931,148 | B2 * | 4/2011 | Hansen | B65D 43/162 206/461 |
| 8,622,216 | B2 * | 1/2014 | Cramblet | B65D 73/0092 206/463 |
| 2010/0102074 | A1 * | 4/2010 | Parikh | B65D 43/0254 220/810 |
| 2011/0056943 | A1 * | 3/2011 | Ueda | A61K 8/0212 220/266 |
| 2012/0103990 | A1 * | 5/2012 | McCumber | B65D 41/165 220/270 |
| 2012/0288660 | A1 | 11/2012 | Maseiker et al. | |
| 2013/0062342 | A1 * | 3/2013 | Hansen | B65D 73/0092 220/4.22 |
| 2013/0077898 | A1 | 3/2013 | Doll et al. | |
| 2014/0054292 | A1 * | 2/2014 | Wallce | A47G 19/022 220/495.03 |
| 2014/0339124 | A1 * | 11/2014 | Sasauchi | B29C 51/10 206/524.3 |

OTHER PUBLICATIONS

International Search Report and Written Opinion for corresponding PCT Application No. PCT/EP2016/073771 dated Jan. 12, 2017.
Combined Search and Examination Report under Sections 17 and 18(3) for corresponding GB Application No. GB1518363.5 dated Dec. 15, 2015.
Topography, Crystallinity and Wettability of Photoablated PET Surfaces, J.S. Rossier et al., Langmuir 1999, 15, 5173-5178.

* cited by examiner

CONTAINER WITH FRANGIBLE WEAKENED PORTION AND MANUFACTURE THEREOF

RELATED APPLICATIONS

This application is a 371 of PCT/EP2016/073771 which was filed on Oct. 5, 2016, which claims the benefit of GB 1518363.5 which was filed Oct. 16, 2015. These applications are hereby incorporated by reference in their entirety.

FIELD OF THE INVENTION

The present invention relates to a container with a frangible weakened portion, for example a weakened tear line, and to a method of manufacturing such a container.

In the packaging industry, it is well known to provide containers with a tamper evident feature to indicate whether or not the container has been opened or tampered with prior to use.

For the manufacture of containers in the form of wide-mouth containers such as trays, cups or tubs, typically thermoforming is used. A sheet of thermoplastic material, typically a polyolefin, is heated and then urged, by a movable mould member and a blowing pressure, into a mould cavity. Such thermoformed trays, cups or tubs often incorporate closures such as snap-on lids. In order to provide a tamper evident feature, the lid is fitted to a body portion of the container and then a sleeve of heat shrinkable film is heat shrunk around the lid. The heat shrunk film may incorporate one or more tear lines. In order to open the container, the user tears along the tear lines to remove the heat shrunk film, and then the lid can be removed. The presence of the heat shrunk film with in-tact tear lines in the film indicates that the container has not been opened or tampered with prior to use.

It is known to produce trays, cups or tubs from polyethylene terephthalate (PET). However, when such containers are used in combination with a heat shrunk film to provide a tamper evident feature, there are two problems. First, the heat shrunk film may not be composed of PET, for example being composed of PVC, and second, the heat shrunk film must be separately removed prior to use, and each problem reduces the facility of recycling the packaging materials.

Also, there is a need in the art for containers such as trays, cups or tubs composed of polyethylene terephthalate (PET) which can have a high thermal stability, for example when subjected to elevated temperature, typically when placed in an oven to cook or reheat food, and high transparency or translucency.

The present invention aims at least partially to overcome these problems of known containers and corresponding container manufacturing methods. There is a need in the art for a container, and a corresponding method of manufacture, which provides cost-effective containers having dimensions to enable them to be used as trays, cups or tubs, and which have a tamper evident feature with good recyclability and low carbon footprint, with such containers optionally having thermal stability at elevated temperatures, for example at oven temperatures, and transparency/translucency, for example a transmissivity through at least a sidewall of the container of at least 90% in visible light.

There is a particular need in the art for transparent thermoplastic trays which can be subjected to elevated temperatures of typically above 150° C., even above 200° C., without thermal distortion so that such trays are "dual ovenable" i.e. can be placed in a microwave oven or a conventional oven to cook or reheat food without degradation of the tray. Such trays have particular application in the packaging of "cook-chill" food which is sold by many supermarkets and grocery stores, and is precooked (at least partially) and refrigerated and sold to the consumer for reheating/finish cooking at home.

SUMMARY OF THE INVENTION

The present invention provides a container comprising a part, in the form of a container body or container closure, optionally a lid, having a frangible weakened portion formed in a layer of polyethylene terephthalate forming a wall of the container body or closure, the frangible weakened portion comprising a groove cut into a first surface of the layer, a first portion of the layer surrounding the groove having a crystallinity of from 35 to 45%, and a second portion of the layer, which second portion is adjacent to the first portion on opposite sides of the groove and remote from the groove, the second portion having a crystallinity at least 5% less than the crystallinity in the first portion, wherein the layer has a thickness of from 200 to 700 µm and the groove has a depth of from 200 to 500 µm.

The present invention further provides a method of manufacturing a container comprising a part, in the form of a container body or container closure, optionally a lid, having a frangible weakened portion formed in a layer of polyethylene terephthalate forming a wall of the container, the method comprising the step of:

(i) laser cutting a groove into a first surface of a layer of polyethylene terephthalate to form a frangible weakened portion, wherein the layer has a thickness of from 200 to 700 µm and the groove has a depth of from 200 to 500 µm, the laser cutting being controlled to provide a first portion of the layer surrounding the groove having a crystallinity of from 35 to 45%, and a second portion of the layer, which second portion is adjacent to the first portion on opposite sides of the groove and remote from the groove, the second portion having a crystallinity at least 5% less than the crystallinity in the first portion.

The present invention is at least partly predicated on the finding by the present inventor that a frangible weakened portion, typically in the form of one or more weakened tear lines, can be laser cut into a layer of polyethylene terephthalate which forms a container body or closure, which may optionally be a lid. The laser cutting can form a groove leaving a specific layer thickness beneath the groove and portions of specific PET crystallinity on opposite sides of the groove.

By providing a specific reduced material thickness beneath the laser cut groove, a relatively high crystallinity adjacent to the groove and a relatively lower crystallinity adjacent to the high crystallinity portion, the material beneath the groove can be manually torn because the high crystallinity is relatively brittle, whereas the relatively lower crystallinity portion is more flexible and so the tearing stress can be confined to the reduced material thickness beneath the laser cut groove.

The parameters of groove depth, layer thickness beneath the groove and PET crystallinity adjacent to the groove has been found to provide that the frangible weakened portion exhibits the combination of robustness against inadvertent opening during manufacture, transport, storage and handling prior to use and ease of manual opening at the time of use. The frangible weakened portion is integral to the PET container, so only one polymer is employed to manufacture the tamper evident container after opening the container the material of the container is unitary, and so only one item of packaging waste to be recycled is produced.

Also, since the entire tamper evident container is composed of PET, the container may have excellent mechanical properties, in particular impact resistance as well as thermal stability at high temperatures and transparency in visible light. A thermoforming step can optionally heat set the PET thermoplastic material of the container.

BRIEF DESCRIPTION OF THE DRAWINGS

Embodiments of the present invention will now be described by way of example only with reference to the accompanying drawings, in which.

DETAILED DESCRIPTION

Figure 1:
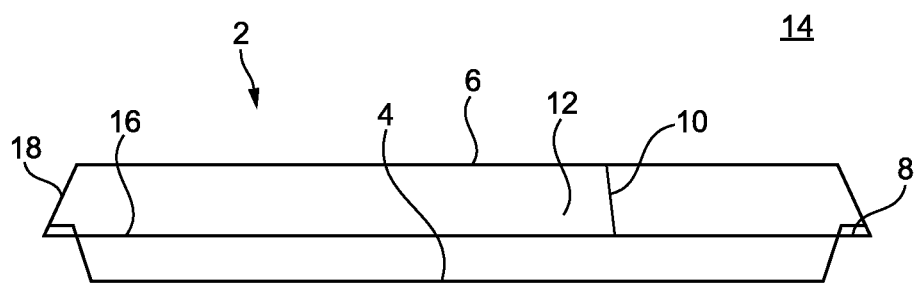
FIG. 1 is a schematic side view of a container having a frangible weakened portion in accordance with a first embodiment of the present invention.

Referring to FIG. 1, there is shown a container 2 which is in the form of a closed or sealed tray. The container comprises a body portion 4 and a closure in the form of a lid 6 fitted thereto. The body portion 4 has been three-dimensionally shaped, for example by a thermoforming process. The body portion 4 is formed of a layer of polyethylene terephthalate, and is typically transparent.

The lid 6 has been three-dimensionally shaped, for example by a thermoforming process. The lid 6 is typically snap-fitted, to the body portion 4 of the container 2. In alternative embodiments, the lid 6 may be bonded, for example thermally bonded or adhered by an adhesive layer, to the body portion 4 of the container 2. The lid 6 may be hingedly attached to the body portion 4. The lid 6 is fitted to the body portion of the container to form a seal 8, optionally a hermetical seal, therebetween.

In this specification the container may be in the form of any wide mouth container which may be in the form of a tray, tub, pot, jar, cup, etc. The wide mouth of the container has an opening which has substantially the same or greater dimensions and area as compared to the body and base of the container. The container may have a variety of different shapes, dimensions and aspect ratios.

The container 2 has a frangible weakened portion 10 formed in a layer 12 of polyethylene terephthalate forming a wall 14 of the container 2. The frangible weakened portion 10 is typically in the form of a weakened tear line. The frangible weakened portion 10 is preferably non-perforated, and provides a localized thinning of the wall 14. The weakened tear line may be a continuous line or an intermittent line. The frangible weakened portion 10 comprises a tamper evident opening line of the container 2.

The wall 14, and thus the frangible weakened portion 10, may be in the body portion 4, or the lid 6, or may extend across the body portion 4 and the lid 6. In the illustrated embodiment of FIG. 1 the frangible weakened portion 10 is in the lid 6, in particular located at a peripheral edge 16 of the lid 6 so that when the frangible weakened portion 10 is torn by separation along the frangible weakened portion 10, the lid 6 can be removed from the body portion 4.

Accordingly, the frangible weakened portion 10 provides a tamper evident closure 18, preferably in the form of a lid 6, for the container 4 so that when the closure 18 is opened, or wholly or partly removed, to open the container 4, the tamper evident closure 18 is torn along at least a part of the frangible weakened portion 10 to indicate that the closure 18 has been opened.

The frangible weakened portion 10 is therefore formed in the layer 12 of polyethylene terephthalate forming the wall 14 of the container 2. Typically the layer 12 comprises a lid 6 of the container 2. Polyethylene terephthalate is a biaxially-orientable thermoplastic material. In some embodiments, the polyethylene terephthalate thermoplastic material may be blended with one or more polyesters, typically one or more polyalkylene polyesters selected from polyethylene terephthalate, polybutylene terephthalate, polyethylene naphthalate and polybutylene naphthalate. Preferably, the biaxially-orientable thermoplastic material is polyethylene terephthalate. The layer 12 has been formed by thermoforming.

Figure 2:
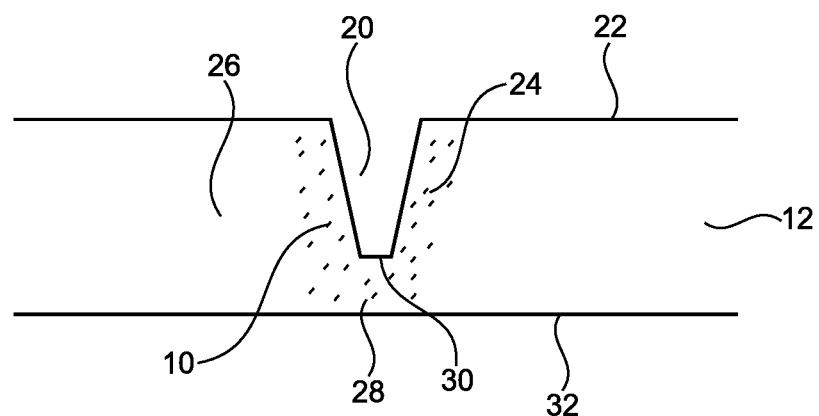
FIG. 2 is a schematic cross-section through a layer of the container of FIG. 1 having the frangible weakened portion.
Figure 3:
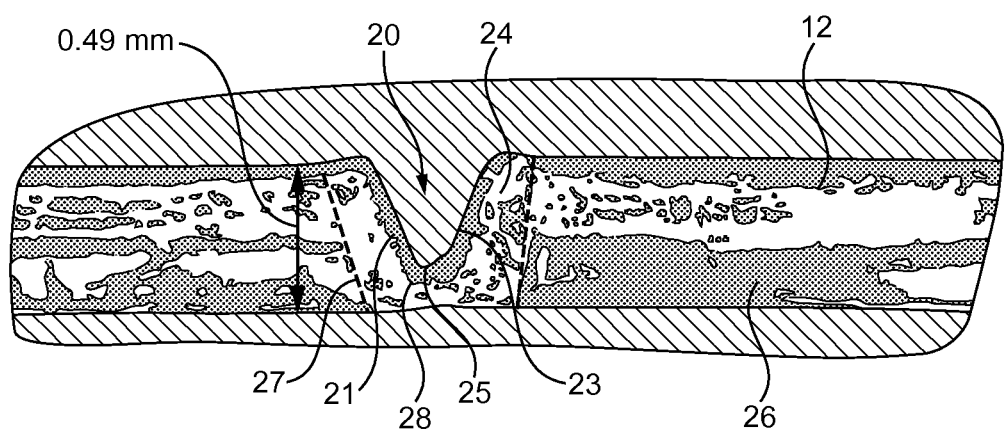
FIG. 3 is a photomicrograph through a layer of the container of FIG. 1 having the frangible weakened portion.

Referring to FIGS. 2 and 3, which shows the frangible weakened portion 10 in greater detail, the frangible weakened portion 10 comprises a groove 20 cut into a first surface 22 of the layer 12. The groove 20 is formed by laser cutting. The layer 12 has a thickness of from 200 to 700 μm and the groove 20 has a depth of from 200 to 500 μm. More typically, the layer 12 has a thickness of from 350 to 650 μm and the groove 20 has a depth of from 300 to 450 μm, and the wall thickness beneath the groove 20 is from 100 to 500 μm, optionally from 100 to 200 μm. Typically, the groove 20 has a depth which is from 40 to 80%, optionally from 70 to 80%, of the thickness of the layer 12.

Typically, the groove 20 has a maximum width, at the top of the groove 20, of from 300 to 400 μm and the groove 20 has a minimum width, at the bottom of the groove 20, of from 75 to 150 μm. Typically, the groove 20 has opposed inwardly inclined sidewalls 21, 23 converging toward a bottom wall 25 to form a substantially trapezoidal cross-section of the groove 20.

FIG. 3 is a photomicrograph through a layer of the container of FIG. 1 having the frangible weakened portion. The thickness of the layer (0.49 mm) is indicated. In FIG. 3, which shows one particularly preferred embodiment, the layer 12 has a thickness of 490 μm, the groove 20 has a depth of 360 μm, the material thickness beneath the groove 20 is 130 μm, the groove 20 has a maximum width, at the top of the groove 20, of 360 μm and the groove 20 has a minimum width, at the bottom of the groove 20, of 110 μm. A first portion 24 of the layer 12 surrounding the groove 20 has a crystallinity of from 35 to 45%. A second portion 26 of the layer 12 is adjacent to the first portion 24 on opposite sides of the groove 20 and is remote from the groove 20. The second portion 26 has a crystallinity at least 5% less, typically from 10 to 15% less, than the crystallinity in the first portion 24. Typically, the second portion 26 has a crystallinity of from 5 to 30%, preferably from 5 to 25%. In FIG. 3 the boundary 27 between the first and second portions 24, 26 of the layer 12 is indicated by a dashed line.

The first portion 24 includes a region 28 extending from a bottom 30 of the groove 20 to a second surface 32 the layer 12, the second surface 32 being opposite to the first surface 22. Typically, the region 28, which is the material thickness beneath the groove 20, is from 100 to 500 μm, optionally from 100 to 200 μm, thick.

Typically, on each side of the groove the first portion 24 has a width, at the top of the groove 20, of from 100 to 250 μm, optionally from 150 to 200 μm. The first portion 24 has a width, beneath the groove 20, of from 300 to 500 μm. The second portion 26 may comprise the remainder of the layer 12, or only a part of the layer 12 surrounding the first portion 24, and in the latter case the second portion 26 may have a width of at least 500 μm.

The groove 20 may be laser cut into the layer 12 either before or after thermoforming the layer 12 to form the lid 6. Also, when the laser cutting is carried out after thermoforming the lid 6, the groove 20 may be laser cut into the layer 12 either before or after the lid has been applied to the container body portion 4.

The thermoformed material of the layer 12 apart from the first portion 24 and second portion 26 may be substantially unoriented and amorphous, i.e. less than 10% crystallinity, or alternatively that thermoformed material may be semi-crystalline and have some orientation resulting from the thermoforming process.

In some embodiments of the present invention the container is transparent or translucent and dimensionally stable at elevated temperatures, for example above 150° C., and therefore can be used to hold food to be cooked or reheated in a cooking oven or a microwave oven. In these embodiments the polyethylene terephthalate may be heat set to allow the container to be subjectable to elevated temperatures without significant distortion, for example in an oven when reheating food contained in the container. Such heat setting may be achieved by holding the container at an elevated temperature to increase the crystallinity of the thermoplastic material. The container may be subjected to quench cooling after the laser cutting or moulding steps to maintain the crystallinity of the thermoplastic material below a preset maximum threshold value.

The container of the preferred embodiments can provide a highly transparent thermoplastic container, such as a tray, which can be subjected to elevated temperatures of typically above 150° C., even above 200° C., without thermal distortion so that such a container is "dual ovenable" i.e. can be placed in a microwave oven or a conventional oven to cook or reheat food without degradation of the tray.

The present invention can provide a container, comprised of a body and a closure, such as a lid, which may be composed entirely of a polyester, in particular PET, in the form of a wide mouth container, for example a tray, cup, or tub, having high visual clarity, and optionally high heat stability. A tamper evident opening line is provided in the container body or lid by the laser cut groove without requiring any additional wrapping material. The PET container can be readily opened by tearing along the frangible weakened portion, which provides a visual indication that the container has been opened. The dimensions of the groove and the layer of PET in which the groove is formed, together with the crystallinity values of the PET in the first and second regions adjacent to the groove, provide a secure and robust tear line which does not inadvertently tear during transport and product handling until a tear force is manually applied to the non-perforated tear line, which prevents ingress of foreign matter into the container (in contrast a perforated line would permit ingress of foreign matter through the perforations).

Various modifications to the illustrated embodiments will be apparent to those skilled in the art and are intended to be included within the scope of the present invention.

The invention claimed is:

1. A container comprising a part, in the form of a container body, a container closure, or a lid, having a frangible weakened portion formed in a layer of polyethylene terephthalate forming a wall of the container, the frangible weakened portion comprising a groove cut into a first surface of the layer, a first portion of the layer surrounding the groove having a crystallinity of 35% to 45%, and a second portion of the layer, wherein said second portion is adjacent to the first portion on opposite sides of the groove and remote from the groove, the second portion having a crystallinity of at least 5% less than the crystallinity in the first portion, wherein the layer has a thickness of 200 μm to 700 μm and the groove has a depth of from 200 to 500 μm.

2. A container according to claim 1 wherein the first portion has a width, at a top of the groove, of 100 μm to 250 μm.

3. A container according to claim 1 wherein the first portion has a width, beneath the groove, of 300 μm to 500 μm.

4. A container according to claim 1 wherein the second portion crystallinity is 10% to 15% less than the crystallinity in the first portion.

5. A container according to claim 4 wherein the second portion crystallinity is 5% to 30%.

6. A container according to claim 1 wherein the layer has a thickness of 350 μm to 650 μm and the groove has a depth of 300 μm to 450 μm.

7. A container according to claim 1 wherein the groove has a depth which is 40% to 80% of the thickness of the layer.

8. A container according to claim 1 wherein the groove has a substantially trapezoidal cross-section, with opposed inwardly inclined sidewalls converging toward a bottom wall.

9. A container according to claim 1 wherein the groove has a maximum width, at a top of the groove, of 300 μm to 400 μm and a minimum width, at a bottom of the groove, of 75 μm to 150 μm.

10. A container according to claim 1 wherein the first portion includes a region extending from a bottom of the groove to a second surface of the layer, the second surface being opposite to the first surface.

11. A container according to claim 10 wherein the region has a thickness of 100 μm to 500 μm.

12. A container according to claim 1 wherein the frangible weakened portion has one or more of the following properties: comprises a tamper evident opening line of the container; is a continuous line; is non-perforated; or forms a localized thinning of the wall along the length of the frangible weakened portion.

13. A container according to claim 1 wherein the layer comprises a lid of the container.

14. A container according to claim 13 wherein the lid has been three-dimensionally shaped by a thermoforming process.

15. A container according to claim 13 wherein the lid is fitted, or snap-fitted, to the container body and wherein the lid is fitted to the container body to form a seal, or a hermetical seal, therebetween.

16. A container according to claim 15 wherein the body portion is formed of a layer of polyethylene terephthalate.

17. A container according to claim 15 wherein the body portion has been three-dimensionally shaped by a thermoforming process.

18. A container according to claim 1 wherein the container is a tray.

19. A method of manufacturing the container of claim 1, the method comprising the step of:
   (i) laser cutting the groove into the first surface of the layer of polyethylene terephthalate to form the frangible weakened portion.

20. A method according to claim 19 wherein the laser cutting is controlled so that the first portion has a width, at a top of the groove, of 100 µm to 250 µm, and the laser cutting is controlled so that the first portion has a width, beneath the groove, of 300 µm to 500 µm.

21. A method according to claim 19 wherein the laser cutting is controlled so that the second portion crystallinity is 10% to 15% less than the crystallinity in the first portion and the second portion crystallinity is 5% to 30%.

22. A method according to claim 19 wherein the layer has a thickness of 350 µm to 650 µm and the groove has a depth of 300 µm to 450 µm.

23. A method according to claim 19 wherein the laser cutting is controlled so that the groove has a depth which is 40% to 80%.

24. A method according to claim 19 wherein the laser cutting is controlled so that the groove has a substantially trapezoidal cross-section, with opposed inwardly inclined sidewalls converging toward a bottom wall.

25. A method according to claim 19 wherein the laser cutting is controlled so that the groove has a maximum width, at a top of the groove, of 300 µm to 400 µm and a minimum width, at a bottom of the groove, of 75 µm to 150 µm.

26. A method according to claim 19 wherein the first portion includes a region extending from a bottom of the groove to a second surface the layer, the second surface being opposite to the first surface, wherein the region has a thickness of 100 µm to 500 µm.

27. A method according to claim 19 wherein the frangible weakened portion has one or more of the following properties: comprises a tamper evident opening line of the container; is a continuous line; is non-perforated; or forms a localized thinning of the wall along the length of the frangible weakened portion.

28. A method according to claim 19 wherein the layer comprises a lid of the container.

29. A container according to claim 2 wherein the width is 150 µm to 200 µm.

30. A container according to claim 5 wherein the second portion crystallinity is 5% to 25%.

31. A container according to claim 6 wherein the wall thickness beneath the groove is 100 µm to 500 µm.

32. A container according to claim 6 wherein the wall thickness beneath the groove is 100 µm to 200 µm.

33. A container according to claim 7 wherein the depth is 70% to 80% of the thickness of the layer.

34. A container according to claim 11 wherein the region has a thickness of 100 µm to 200 µm.

35. A method according to claim 20 wherein the first portion width at the top of the groove is 150 µm to 200 µm.

36. A method according to claim 21 wherein the second portion crystallinity is 5% to 25%.

37. A method according to claim 22 wherein the wall thickness beneath the groove is 100 µm to 500 µm.

38. A method according to claim 22 wherein the wall thickness beneath the groove is 100 µm to 200 µm.

39. A method according to claim 23 wherein the depth of the groove is 70% to 80% of the thickness of the layer.

40. A method according to claim 26 wherein the thickness of the region is 100 µm to 200 µm.

* * * * *